US008599400B2

(12) United States Patent
Nakamura et al.

(10) Patent No.: US 8,599,400 B2
(45) Date of Patent: Dec. 3, 2013

(54) IMAGE FORMING DEVICE, CONTROL METHOD, AND PROGRAM FOR IMAGE FORMING DEVICE

(75) Inventors: Shigeru Nakamura, Kanagawa (JP); Takafumi Shimmoto, Kanagawa (JP); Kohji Ishikura, Kanagawa (JP); Masaki Tasaka, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 417 days.

(21) Appl. No.: 12/923,242

(22) Filed: Sep. 10, 2010

(65) Prior Publication Data

US 2011/0063652 A1    Mar. 17, 2011

(30) Foreign Application Priority Data

Sep. 14, 2009 (JP) ................. 2009-211231

(51) Int. Cl.
*G06K 15/00* (2006.01)
*G06F 15/00* (2006.01)

(52) U.S. Cl.
USPC ......................... 358/1.14; 358/1.19

(58) Field of Classification Search
USPC ........... 358/1.2, 1.18, 1.5, 1.15, 1.9, 2.1, 474, 358/401, 1.14
See application file for complete search history.

(56) References Cited

U.S. PATENT DOCUMENTS

| | | | | |
|---|---|---|---|---|
| 7,035,426 B2 * | 4/2006 | Nishikawa et al. | ........... | 382/100 |
| 8,125,690 B2 * | 2/2012 | Aoyagi | ........................ | 358/3.28 |
| 8,218,178 B2 * | 7/2012 | Ebitani | ........................ | 358/1.15 |
| 2009/0185235 A1 * | 7/2009 | Ebitani | ........................ | 358/401 |
| 2009/0279110 A1 * | 11/2009 | Ito | ..................... | 358/1.5 |
| 2010/0328728 A1 * | 12/2010 | Kakutani | ...................... | 358/448 |
| 2011/0063343 A1 * | 3/2011 | Ito | ..................... | 347/5 |
| 2011/0090526 A1 * | 4/2011 | Takahashi | .................... | 358/1.14 |
| 2012/0057742 A1 * | 3/2012 | Hosoda | .......................... | 382/100 |
| 2012/0113438 A1 * | 5/2012 | Aoyagi | .......................... | 358/1.2 |
| 2012/0287474 A1 * | 11/2012 | Ito | ................................ | 358/1.18 |

FOREIGN PATENT DOCUMENTS

| | | |
|---|---|---|
| JP | 2006-080939 | 3/2006 |
| JP | 2008-227743 | 9/2008 |

* cited by examiner

*Primary Examiner* — Jerome Grant, II
(74) *Attorney, Agent, or Firm* — Harness, Dickey & Pierce

(57) ABSTRACT

When a control code detection unit detects a control code, an image storage unit stores the image data of pages that are entered after the page with the control code added thereto. A control code decision unit decides the content of control for the output processing of the image data based on all the control codes detected by the control code detection unit. Then, based on the content of control decided by the control code decision unit, a control unit controls the output processing of the image data stored in the image storage unit.

11 Claims, 15 Drawing Sheets

FIG. 2

| CONTROL CODE | PRINTING | EMAIL TRANSMISSION | FACSIMILE TRANSMISSION | SECURITY LEVEL |
|---|---|---|---|---|
| 1 | NO SHEET EJECTED | TRANSMISSION PROHIBITED | TRANSMISSION PROHIBITED | 1 |
| 2 | PRINTING WITH SOLID FILL | NON-PRINTABLE PDF | TRANSMISSION PROHIBITED | 2 |
| 3 | PRINTING WITH SOLID FILL | NON-PRINTABLE PDF WITH VIEWING AUTHORIZED | TRANSMISSION PROHIBITED | 3 |
| 4 | ○ | TRANSMISSION PROHIBITED | TRANSMISSION PROHIBITED | 7 |
| 5 | ○ | NON-PRINTABLE PDF WITH VIEWING AUTHORIZED | TRANSMISSION PROHIBITED | 8 |
| 6 | ○ | ADDRESSING PERMITTED ONLY FROM ADDRESS BOOK | ADDRESSING PERMITTED ONLY FROM ADDRESS BOOK | 9 |
| 7 | PRINTING OF USER NAME AND TIME | PRINTING OF USER NAME AND TIME | PRINTING OF USER NAME AND TIME | 15 |
| 8 | ○ | DATE AND TIME RESTRICTION | ○ | 10 |
| 9 | ○ | STARTING OF SPECIFIED APPLICATION | ○ | 14 |
| 10 | ○ | ○ | ○ | 11 |
| 11 | ○ | LOG | LOG | 12 |
| 12 | LOG | ○ | ○ | 6 |
| 13 | IMAGE LOG | ○ | ○ | 5 |
| 14 | ○ | ○ | ALARM | 13 |
| 15 | NO SHEET EJECTED | NOTIFYING ADMINISTRATOR BY EMAIL | NOTIFYING ADMINISTRATOR BY EMAIL | 4 |

FIG. 3

| CASE WHERE CONTROL CODE IS STORED ON DOCUMENT-BY-DOCUMENT BASIS | CASE WHERE CONTROL CODE IS STORED ON PAGE-BY-PAGE BASIS |
|---|---|
| TRANSMISSION PROHIBITED<br>NON-PRINTABLE PDF<br>NON-PRINTABLE PDF WITH VIEWING AUTHORIZED<br>ADDRESSING PERMITTED ONLY FROM ADDRESS BOOK<br>DATE AND TIME RESTRICTION<br>STARTING OF SPECIFIED APPLICATION<br>NOTIFYING ADMINISTRATOR BY EMAIL<br>ALARM | NO SHEET EJECTED<br>PRINTING WITH SOLID FILL<br>PRINTING OF USER NAME AND TIME<br>LOG<br>IMAGE LOG<br>NO SHEET EJECTED |

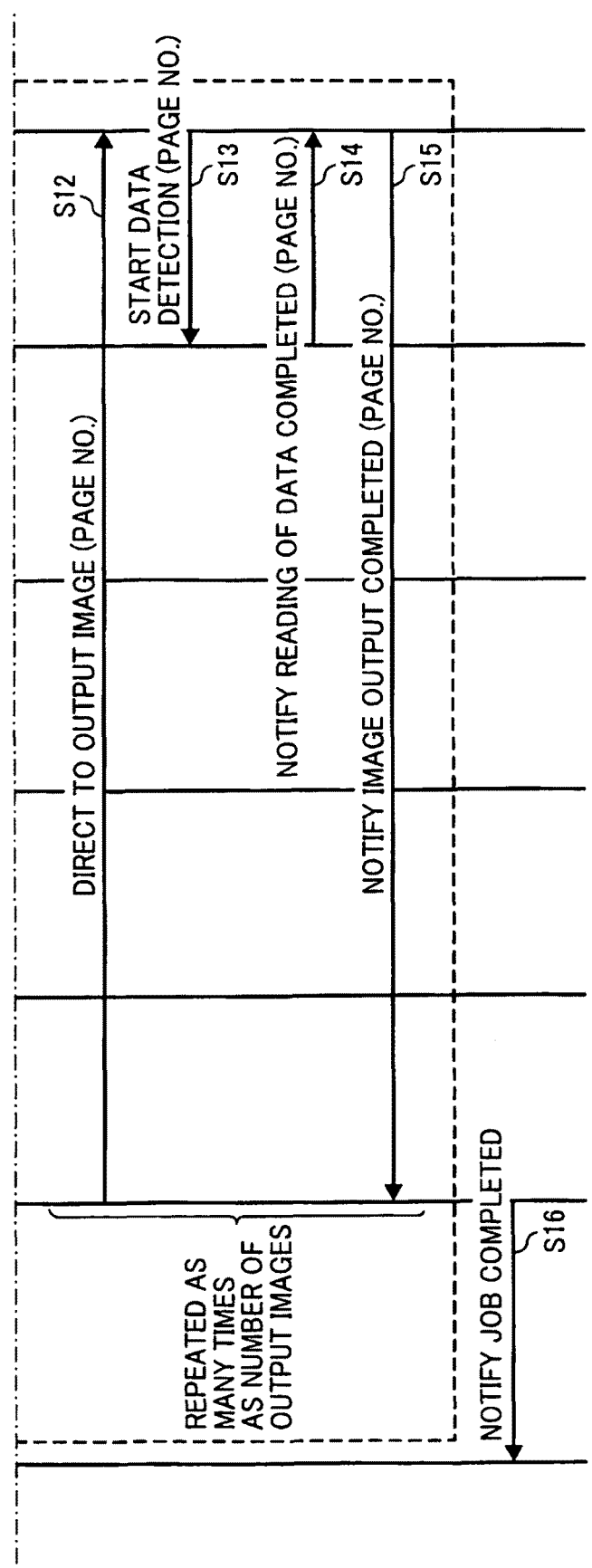

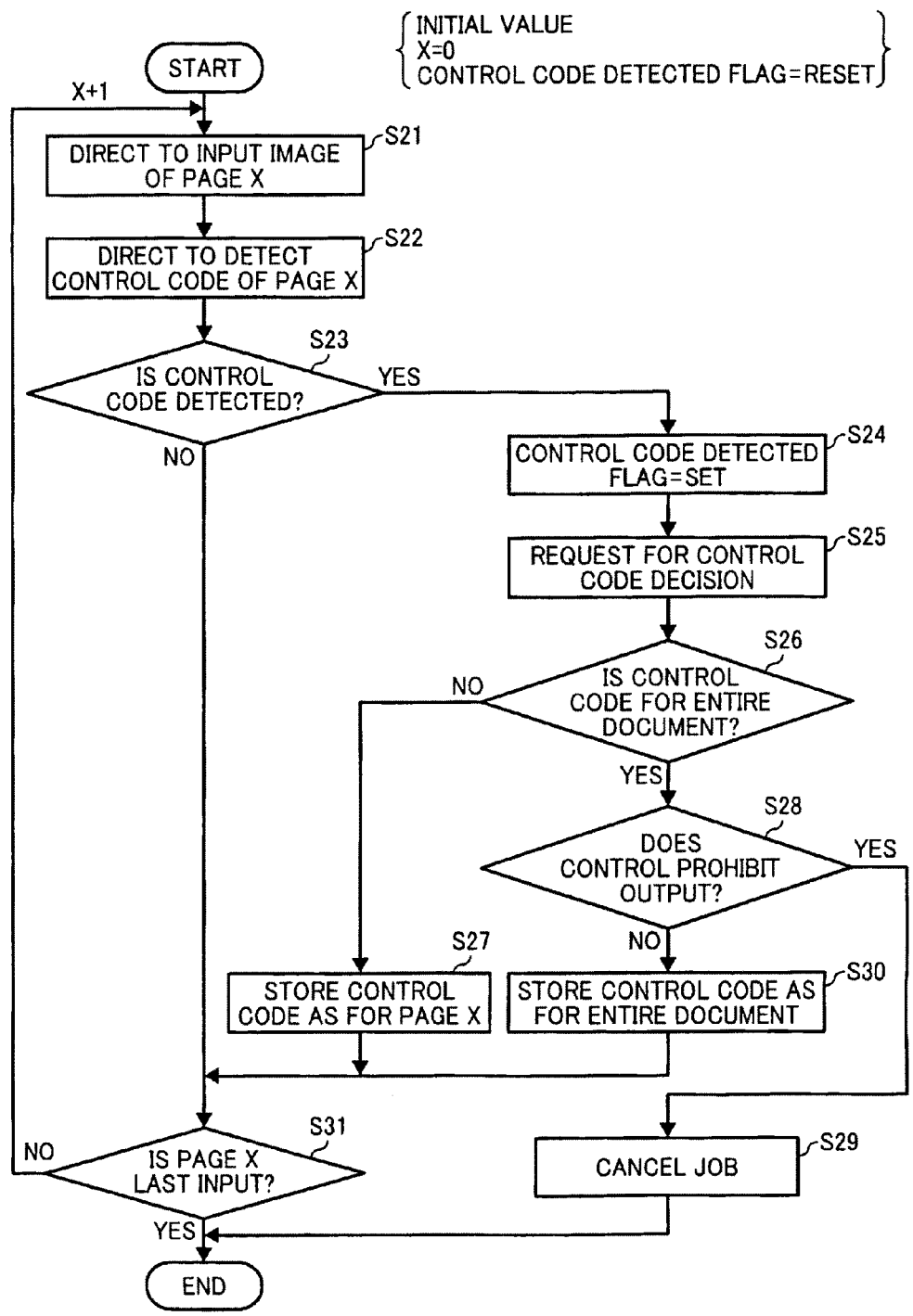

IMAGE FORMING DEVICE, CONTROL METHOD, AND PROGRAM FOR IMAGE FORMING DEVICE

CROSS-REFERENCE TO RELATED APPLICATIONS

The present application claims priority to and incorporates by reference the entire contents of Japanese Patent Application No. 2009-211231 filed in Japan on Sep. 14, 2009.

BACKGROUND OF THE INVENTION

1. Field of the Invention

The present invention relates to an image forming device, a control method for the image forming device, and a control program for the image forming device.

2. Description of the Related Art

Conventionally use has been made of image forming devices such as scanners for reading original images, copiers for printing those original images read by scanners, printers or facsimiles for printing externally input original images, and the so-called multi-function peripherals (MFP) that have the functions of those electronic devices. Some image forming devices of this type operate to read a marking (such as a two-dimensional barcode), in which a control code is embedded, from an original image, when being commanded to output (print or transmit) the original image. Then, the devices provide control to the output processing of the original image in accordance with the control code embedded in the marking (see Japanese Patent Application Laid-open No. 2006-080939 and Japanese Patent Application Laid-open No. 2008-227743).

Conventional image forming devices are configured to control the process of outputting original images on a "document-by-document" or "page-by-page" basis in accordance with the control code embedded in the marking. The conventional image forming device designed as such may not be able to ensure the security of a document in its output processing when a page having an embedded entire-document control code and a page having an embedded one-page control code exist simultaneously in no particular order within the document. More specifically, suppose that the first page having a "document output not permitted" code as an embedded control code and the second page having a "page output permitted" code as an embedded control code coexist in no particular order within the document. In this case, if the control code embedded in the second page is read before the control code embedded in the first page, the second page is output even though the entire document is prohibited from being output. This makes it impossible to provide the security of the document in its output processing.

SUMMARY OF THE INVENTION

It is an object of the present invention to at least partially solve the problems in the conventional technology.

According to an aspect of the present invention an image forming device comprises: an image input unit configured to input, on a page-by-page basis, image data of a document having a plurality of pages; a control code detection unit configured to detect, on a page-by-page basis, a control code for output processing of the image data, the control code being added to the image data input by the image input, unit; an image data storage unit configured to store, in a memory unit, image data of a page entered after the page with the control code added thereto, when the control code detection unit detects the control code; a control code decision unit configured to decide a content of control for the output processing of the image data in accordance with all control codes detected by the control code detection unit; and a control unit configured to control the output processing of the image data stored in the memory unit in accordance with the content of control decided by the control code decision unit.

According to another aspect of the present invention, a method for controlling an image forming device comprises: an image input step of inputting, on a page-by-page basis, image data of a document having a plurality of pages; a control code detection step of detecting, on a page-by-page basis, a control code for output processing of the image data, the control code being attached to the image data input in the image input step; an image data storing step of storing, in memory unit, image data of a page entered after the page with the control code attached thereto, when the control code is detected in the control code detection step; a control code decision step of deciding a content of control for the output processing of the image data in accordance with all control codes detected in the control code detection step; and a control step of controlling the output processing of the image data stored in the memory unit during the image data storing step in accordance with the content of control decided in the control code decision step.

According to still another aspect of the present invention, a computer program product comprises a computer usable medium having computer readable program codes embodied in the medium that when executed causes a computer to execute: an image input step of inputting, on a page-by-page basis, image data of a document having a plurality of pages; a control code detection step of detecting, on a page-by-page basis, a control code for output processing of the image data, the control code being added to the image data inputted in the image input step; an image data storing step of storing, in memory unit, image data of a page entered after the page with the control code added thereto, when the control code is detected in the control code detection step; a control code decision step of deciding a content of control for the output processing of the image data in accordance with all control codes detected in the control code detection step; and a control step of controlling the output processing of the image data stored in the memory unit during the image data storing step in accordance with the content of control decided in the control code decision step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a view illustrating an example of a control code for the output processing executed by the image forming device illustrated in FIG. 1;

FIG. 3 is a view illustrating an example of a result of the control information illustrated in FIG. 2 being classified into document-by-document or page-by-page control codes;

FIG. 5 is a flowchart illustrating the operation flow for a control unit to execute the input processing according to a first embodiment of the present invention;

DETAILED DESCRIPTION OF THE PREFERRED EMBODIMENTS

Figure 1:
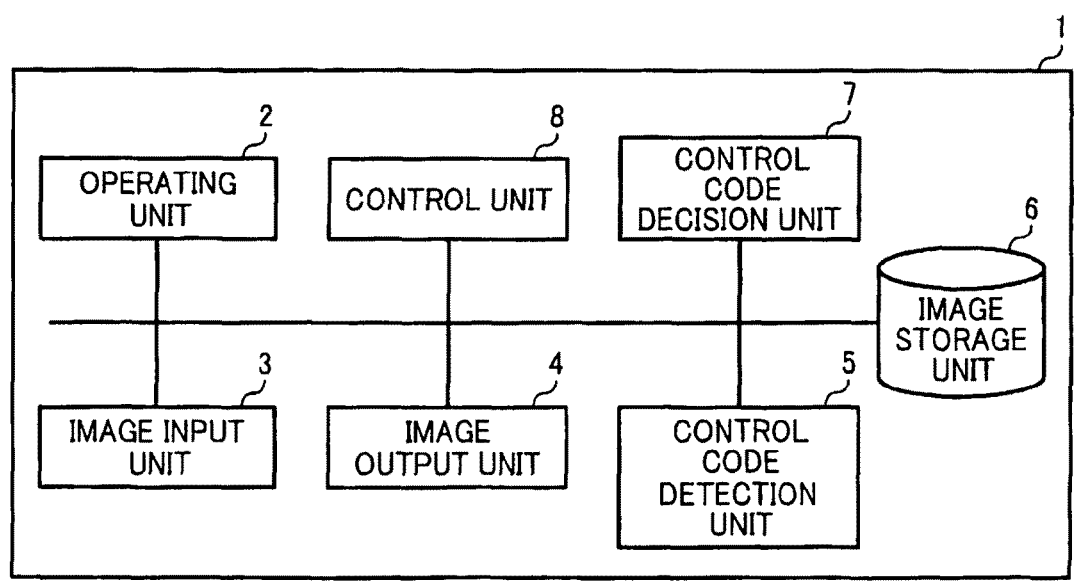
FIG. 1 is a block diagram illustrating the configuration of an image forming device according to an embodiment of the present invention.

Now, referring to the drawings, a description will be made to the configuration and the operation of an image forming device according to an embodiment of the present invention.
[Configuration of Image Forming Device]

To begin with, the configuration of an image forming device according to an embodiment of the present invention will be described with reference to FIG. 1.

As illustrated in FIG. 1, an image forming device 1 according to an embodiment of the present invention mainly includes an operating unit 2, an image input unit 3, an image output unit 4, a control code detection unit 5, an image storage unit 6, a control code decision unit 7, and a control unit 8, as main components.

The operating unit 2 includes a display unit for displaying a message indicating a function setting key, the number of copies (prints), and the status of the image forming device 1, and an input unit for receiving key entries from a ten-key pad (a numeric keypad), clear/stop key, start key, warm-up key, reset key, initial setting key, print key, send key, and save key. The display unit displays images and serves also as an input unit which allows the user to input commands on the touch panel. The user may operate the operating unit 2 to input or output images or provide operational settings for the output processing.

The image input unit 3, which includes an original document read unit and a communication interface, inputs read or externally input image data into the image storage unit 6. The image output unit 4, which includes an output device such as a printing device, an email transmission device, or a facsimile, outputs the image data stored in the image storage unit 6 via the specified output device. The control code detection unit 5 detects the control code attached to the image data, based on a control signal received from the control unit 8.

The image storage unit 6 includes well-known storage devices such as HDDs (Hard Disk Drive), optical discs, memory cards, or RAMs (Random Access Memory). The image storage unit 6 stores the image data entered from the image input unit 3 by associating the image data with the identification information (for example, page numbers) that uniquely identifies the data. The image storage unit 6 includes a function to read the specified image data based on the control signal from the control unit 8. To make it possible to read the stored image data even after the device is powered off, the image storage unit 6 is preferably composed of a nonvolatile memory device such as HDD and the like. Based on the control signal from the control unit 8, the control code decision unit 7 determines the contents of the control code detected by the control code detection unit 5. The control unit 8, which is composed of a well-known processor such as CPUs (Central Processing Unit), controls the operation of the entire image forming device 1.

The control code decision unit 7 has a table in which the control codes, as illustrated in FIG. 2, is associated with the operation and the security level value of every output device that constitutes the image output unit 4. The control code decision unit 7 refers to the above described table to determine the contents of the control codes. In the present embodiment, the security level value is defined so that the less the security level value, the higher the security strength becomes. The operation of each output device specified in the table illustrated in FIG. 2 is classified, as illustrated in FIG. 3, into one mode applicable on a "page-by-page" basis and the other mode applicable on a "document-by-document" basis. Accordingly, depending on the type of the output device, even the same control code may be the "document-by-document" control code on one occasion, and may be the "page-by-page" control code on another occasion. More specifically, since the operation of the printing device associated with the control code "1" is "sheet not ejected" as illustrated in FIG. 2, the control code "1" for the printing device is thus the "page-by-page" control code as illustrated in FIG. 3. On the other hand, since the operation of the email transmission device and the facsimile, associated with the control code "1," is the "transmission prohibited" as illustrated in FIG. 2, the control code "1" for the email transmission device and the facsimile is the "document-by-document" control code as illustrated in FIG. 3.

The image forming device 1 configured in this manner executes the input processing and the output processing illustrated below. Thus the image forming device 1 ensures the security of a document in the output processing even when a page with control information for the entirety of the document and a page with control information for one page coexist in no particular order within the document. Now, referring to the timing chart illustrated in FIG. 4, a description will be made to the operation of the image forming device 1 to execute the input processing (the processing of steps S2 to S11) and the output processing (the processing of steps S12 to S15). Note that the image forming device 1 repeatedly executes in parallel the input processing and output processing illustrated below by the number of pages of image data.
[Input Processing]

To begin with, referring to the timing chart illustrated in FIG. 4, a description will be made to the image forming device 1 operating to execute the input processing.

Figure 4A:
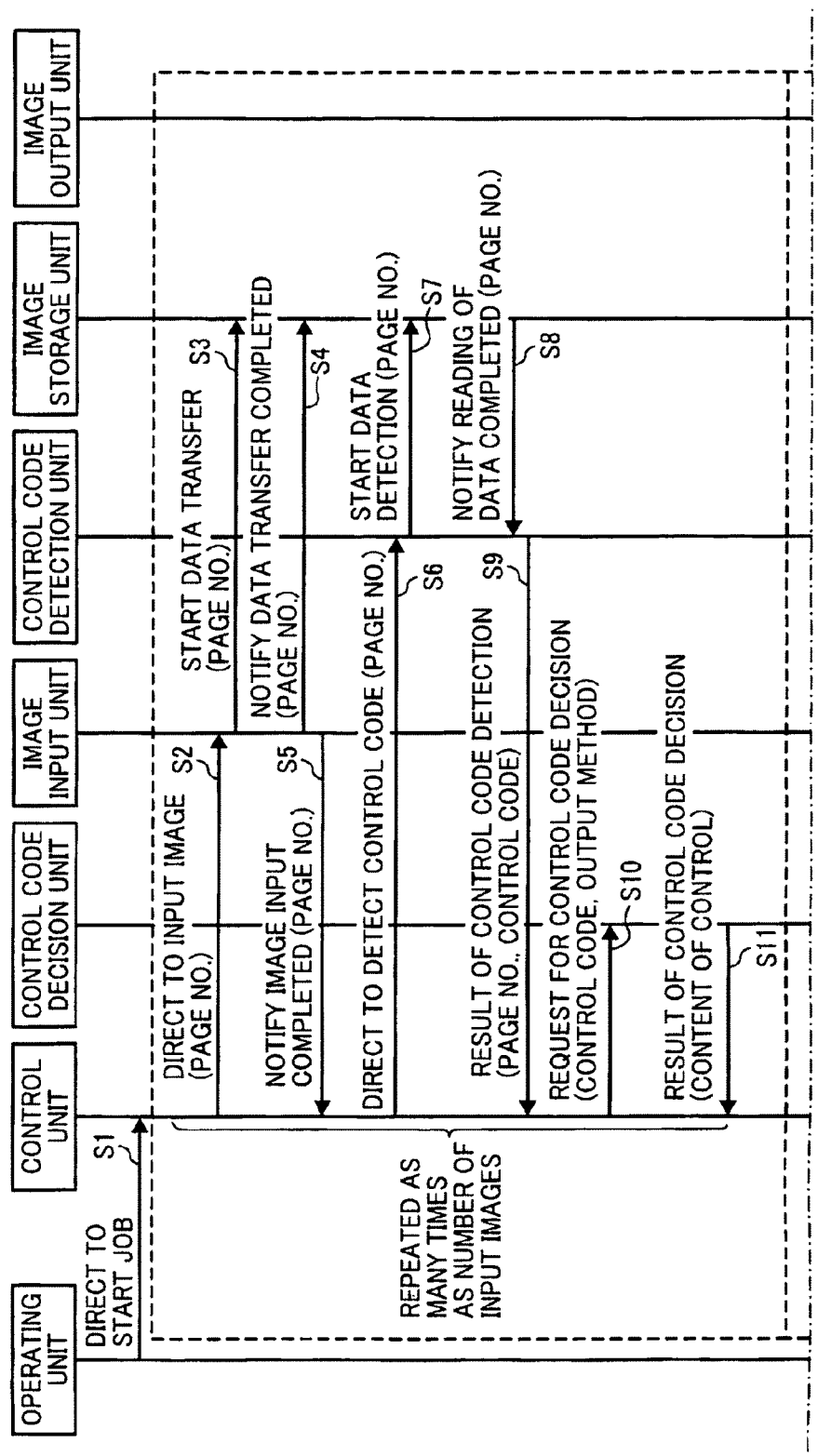
FIG. 4 is a timing chart illustrating the flow of the input processing and the output processing according to an embodiment of the present invention.

The timing chart illustrated in FIG. 4 is initiated at the timing at which the user operates the operating unit 2 as the processing of step S1 to thereby read the image data of a document with a plurality of pages, and then commands the execution of an output job. The input processing proceeds to the processing of step S2. When commanding the execution of a job, the user may specify the type of the output device used for the output processing (such as the printing device, the email transmission device, or the facsimile).

In the processing of step S2, the control unit 8 directs the image input unit 3 to input the image data of the Xth page that constitutes the document. By doing so, the processing of step S2 is completed, and then the input processing proceeds to the processing of step S3.

In the processing of step S3, the image input unit 3 reads the image data of the Xth page and starts to transfer the read image data to the image storage unit 6. By doing so, the processing of step S3 is completed, and then the input processing proceeds to the processing of step S4.

In the processing of step S4, the image input unit 3 completes the transfer of the image data to the image storage unit 6. By doing so, the processing of step S4 is completed, and then the input processing proceeds to the processing of step S5.

In the processing of step S5, the image input unit 3 notifies the control unit 8 that the input of the image data of the Xth page has been completed. By doing so, the processing of step S5 is completed, and then the input processing proceeds to the processing of step S6.

In the processing of step S6, the control unit 8 directs the control code detection unit 5 to detect the control code added to the image data of the Xth page. By doing so, the processing of step S6 is completed, and then the input processing proceeds to the processing of step S7.

In the processing of step S7, the control code detection unit 5 starts reading the control code added to the image data of the Xth page stored in the image storage unit 6. By doing so, the processing of step S7 is completed, and then the input processing proceeds to the processing of step S8.

In the processing of step S8, the control code detection unit 5 completes reading of the control code added to the image data of the Xth page stored in the image storage unit 6. By doing so, the processing of step S8 is completed, and then the input processing proceeds to the processing of step S9.

In the processing of step S9, the control code detection unit 5 notifies the control unit 8 of the result of reading of the control code. By doing so, the processing of step S9 is completed, and then the input processing proceeds to the processing of step S10.

In the processing of step S10, the control unit 8 transmits, to the control code decision unit 7, the control code notified by the control code detection unit 5 and the information regarding the type of the output device to be used for the output processing specified by the user. Then, the control unit 8 requests the control code decision unit 7 to determine the content of the control code. By doing so, the processing of step S10 is completed, and then the input processing proceeds to the processing of step S11.

In the processing of step S11, the control code decision unit 7 refers to the table illustrated in FIG. 2 to notify the control unit 8 of the content of the control code read by the control code detection unit 5. For example, when the control code is "1" and the output method is "printing," the control code decision unit 7 notifies the control unit 8 that the sheet ejecting operation will not be performed. By doing so, the processing of step S11 is completed and the sequence of the output processing is completed.

[Output Processing]

Now, referring to the timing chart illustrated in FIG. 4, a description will be made to the image forming device 1 operating to execute the output processing.

The timing chart illustrated in FIG. 4 is initiated at the timing at which the input processing is completed for one page of image data, and the output processing proceeds to the processing of step S12.

In the processing of step S12, based on the contents notified by the control code decision unit 7 in the processing of step S11, the control unit 8 directs the image output unit 4 to output the image data of the Xth page. By doing so, the processing of step S12 is completed, and the output processing proceeds to the processing of step S13.

In the processing of step S13, the image output unit 4 starts reading the image data of the Xth page from the image storage unit 6. By doing so, the processing of step S13 is completed, and the output processing proceeds to the processing of step S14.

In the processing of step S14, the image output unit 4 finishes reading the image data of the Xth page stored in the image storage unit 6. By doing so, the processing of step S14 is completed, and the output processing proceeds to the processing of step S15.

In the processing of step S15, the image output unit 4 outputs the image data read out based on the contents notified by the control code decision unit 7 in the processing of step S11, and then at the timing at which the image data has been completely output, notifies the control unit 8 that the output of the image data is completed. By doing so, the processing of step S15 is completed, and the output processing proceeds to the processing of step S16.

In the processing of step S16, the control unit 8 controls the operating unit 2, thereby notifying the user that the job has been executed completely. By doing so, the processing of step S16 is completed and the sequence of the output processing is completed.

[Operation of the Control Unit]

Now, a description will be made to the first to fourth embodiments of the aforementioned input processing and output processing.

First Embodiment

To begin with, referring to the flowcharts illustrated in FIGS. 5 and 6, a description will be made to the control unit 8 operating to execute the input processing and the output processing according to the first embodiment.

[Input Processing]

The flowchart illustrated in FIG. 5 is initiated at the timing at which the user operates the operating unit 2 to thereby read the image data of a document with a plurality of pages, and then commands the execution of an output job. The input processing proceeds to the processing of step S21. Note that when commanding the execution of a job, the user specifies the type of the output device used for the output processing (such as the printing device, the email transmission device, or the facsimile).

In the processing of step S21, the control unit 8 directs the image input unit 3 to input the image data of the Xth (initial value 0) page that constitutes the document. By doing so, the processing of step S21 is completed, and then the input processing proceeds to the processing of step S22.

In the processing of step S22, the control unit 8 directs the control code detection unit 5 to detect the control code added to the image data of the Xth page. The control code detection unit 5 notifies the control unit 8 of the result of detecting the control code. By doing so, the processing of step S22 is completed, and then the input processing proceeds to the processing of step S23.

In the processing of step S23, based on the result of detecting the control code notified by the control code detection unit 5, the control unit 8 determines whether the control code has been detected. If it is found as a result of the determination that the control code was, not detected, then the control unit 8 allows the input processing to proceed to the processing of step S31. On the other hand, if the control code was detected, the control unit 8 allows the input processing to proceed to the processing of step S24.

In the processing of step S24, the control unit 8 sets, to a SET status, a control code detected flag indicative of whether the control code has already been detected. In the present embodiment, with the control code having been already detected, the control code detected flag is set to the SET status, whereas with the control code having not yet been detected, the flag is set to a RESET status. At the start point of the input processing, the control code detected flag is set at the RESET status. By doing so, the processing of step S24 is completed, and then the input processing proceeds to the processing of step S25.

In the processing of step S25, the control unit 8 directs the control code decision unit 7 to determine the content of the control code detected in the processing of step S22. The control code decision unit 7 notifies the control unit 8 of the content of the control code. By doing so, the processing of step S25 is completed, and then the input processing proceeds to the processing of step S26.

In the processing of step S26, based on the content of the control code notified by the control code decision unit 7, the control unit 8 determines whether the operation of the output device that corresponds to the control code is toward the Xth page or the entire document. When it is found as a result of the determination that the operation of the output device corresponds to the control code toward the Xth page, the control unit 8 allows the input processing to proceed to the processing of step S27. On the other hand, when it is found that the operation of the output device that corresponds to the control code is toward the entire document, the control unit 8 allows the input processing to proceed to the processing of step S28.

In the processing of step S27, the control unit 8 stores the control code detected in the processing of step S22 as associated with the Xth page. By doing so, the processing of step S27 is completed, and then the input processing proceeds to the processing of step S31.

In the processing of step S28, based on the content of the control code notified by the control code decision unit 7, the control unit 8 determines whether the control code is to direct the prohibition of the output of the entire document. When it is found as a result of the determination that the control code is to direct not to output the entire document, the control unit 8 allows the input processing to proceed to the processing of step S29. On the other hand, when the control code is not to prohibit the output of the entire document, the control unit 8 allows the input processing to proceed to the processing of step S30.

In the processing of step S29, the control unit 8 cancels the job directed by the user, and then controls the operating unit 2, thereby notifying the user of the information that the job has been canceled. By doing so, the processing of step S29 is completed and then the sequence of the input processing is completed.

In the processing of step S30, the control unit 8 stores the control code detected in the processing of step S22 as associated with the entire document. By doing so, the processing of step S30 is completed, and then the input processing proceeds to the processing of step S31.

In the processing of step S31, the control unit 8 determines whether the Xth page is the final page of the document. When it is found as a result of the determination that the Xth page is the final page of the document, the control unit 8 exits the sequence of the input processing. On the other hand, when the Xth page is not the final page of the document, the control unit 8 increments the value of X by one, and after that, returns the input processing to the processing of step S21.

[Output Processing]

Figure 6:
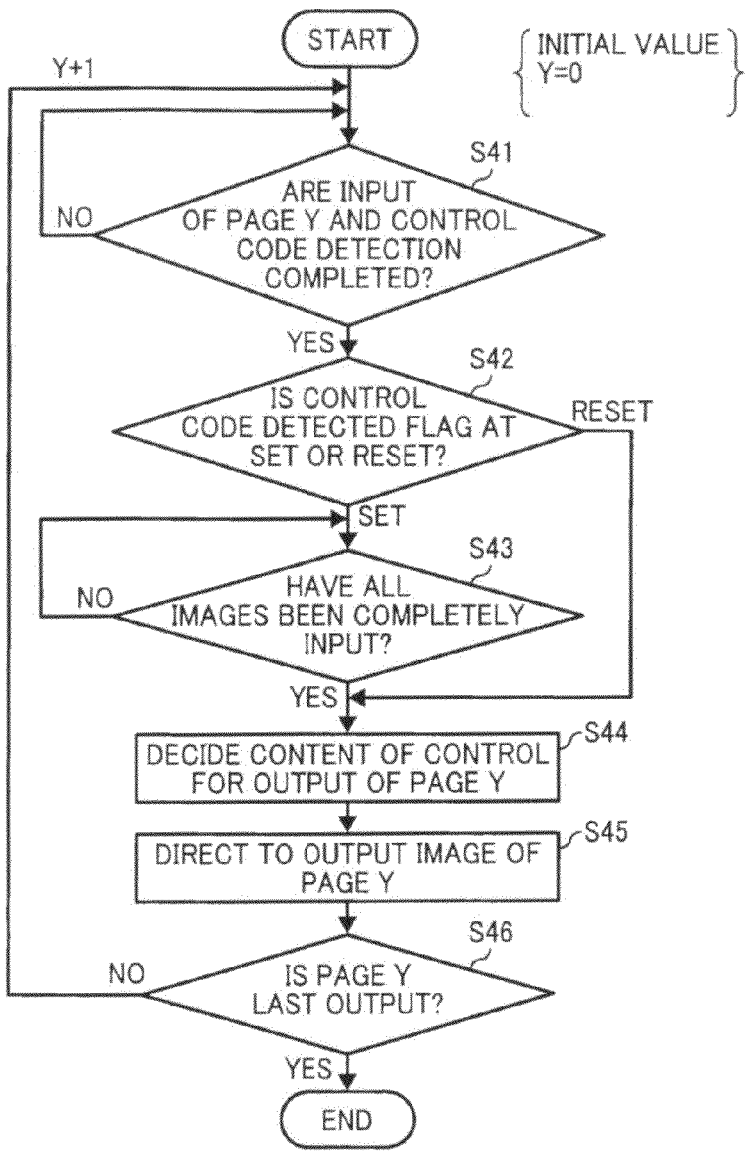
FIG. 6 is a flowchart illustrating the operation flow for the control unit to execute the output processing according to the first embodiment of the present invention.

The flowchart illustrated in FIG. 6 is initiated at the timing at which the user operates the operating unit 2 to thereby read the image data of a document and then commands the execution of an output job. The output processing proceeds to the processing of step S41.

In the processing of step S41, the control unit 8 determines whether the image data of the Yth (initial value 0) page that constitutes the document is completely inputted and the control code has been completely detected. Then, the control unit 8 allows the output processing to proceed to the processing of step S42 at the timing at which the image data of the Yth page has been completely inputted and the control code has been completely detected.

In the processing of step S42, the control unit 8 determines whether the control code detected flag is at the SET status or at the RESET status. When it is found as a result of the determination that the control code detected flag is at the RESET status, the control unit 8 allows the output processing to proceed to the processing of step S44. On the other hand, when the control code detected flag is at the SET status, the control unit 8 allows the output processing to proceed to the processing of step S43.

In the processing of step S43, the control unit 8 determines whether all the pages have been completely inputted. Then, the control unit 8 allows the output processing to proceed to the processing of step S44 at the timing at which all the pages have been completely inputted.

In the processing of step S44, the control unit 8 decides the content of control that is to be provided when the image data of the Yth page is outputted. More specifically, with the control code detected flag at the SET status, the control unit 8 decides the content of control based on the control code for the Yth page. On the other hand, with the control code detected flag at the RESET status, the control unit 8 determines that the control code has not been added and thus decides the content of control to be the default control content. By doing so, the processing of step S44 is completed, and the output processing proceeds to the processing of step S45.

In the processing of step S45, the control unit 8 directs the image output unit 4 to output the image data of the Yth page based on the content of control determined in the processing of step S44. The image output unit 4 outputs the image data of the Yth page in accordance with the content of control directed by the control unit 8. By doing so, the processing of step S45 is completed, and the output processing proceeds to the processing of step S46.

In the processing of step S46, the control unit 8 determines whether the Yth page is the final page. When it is found as a result of the determination that the Yth page is the final page, the control unit 8 terminates the sequence of the output processing. On the other hand, when the Yth page is not the final page, the control unit 8 increments the value of Y by one and then allows the output processing to return to the processing of step S41.

As may be obvious from the above discussions, in the input processing and the output processing according to the first embodiment of the present invention, the control code detection unit 5 may detect a control code. In this case, the image storage unit 6 stores image data of a page that is entered after the page with the control code attached thereto. The control code decision unit 7 decides the content of control for the output processing of the image data based on all the control codes detected by the control code detection unit 5. Then, the control unit 8 controls the output processing of the image data stored in the image storage unit 6 in accordance with the content of control decided by the control code decision unit 7.

That is, the input processing and the output processing according to the first embodiment of the present invention do not execute the output processing page-by-page basis. That is, when the page with the control code added thereto is detected, the output processing starts at the timing at which the image data of the page that has been entered after a page with the control code added thereto has been completely inputted and the detection of the control code has been completed. Accordingly, the input processing and the output processing according to the first embodiment of the present invention make it possible to secure the security of the document in the output processing even when a page with the control code for the entire document added thereto and a page with the page-by-page control code added thereto coexist in no particular order within the document.

In the input processing and the output processing according to the first embodiment of the present invention, a control code (for example, the control code for directing the entire document not to be output) may be detected which can determine the content of control for the output processing of the image data before the image data of all the pages is completely inputted. In this case, the control unit 8 starts to perform the output processing of the image data (for example, the job cancel processing) in accordance with that control content, and thus the time required for the output processing may be reduced.

Figure 7:
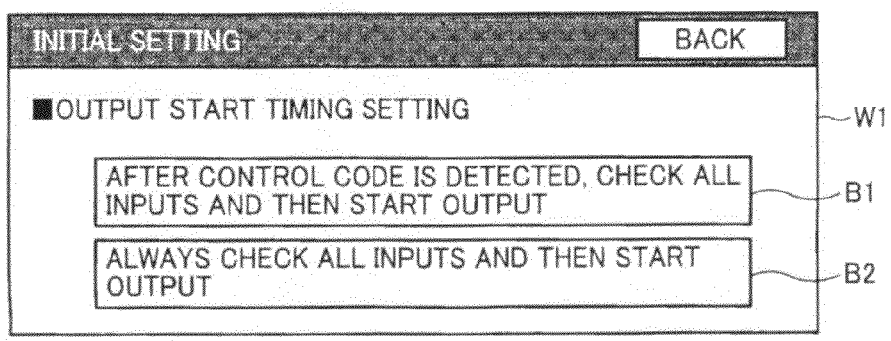
FIG. 7 is a view illustrating an example of an initial Setting window for setting the start timing of the output processing.

In the present embodiment, when the control code is detected, the output processing is started at the timing at which the input processing of the image data of all the pages is completed. However, when a higher security is required for the output processing of the document, the user may opt and direct to start the output processing always at the timing at which the input processing of the image data of all pages is completed even when the control code is not detected. This may be done by depressing a button B2 on an initial setting window W1, which is displayed on the touch panel screen of the operating unit 2 as illustrated in FIG. 7. In this case, at the start point of the job, the control code detected flag is set to the SET status.

Second Embodiment

Now, referring to the flowchart illustrated in FIG. 8, a description will be made to the control unit 8 operating to execute the input processing and the output processing according to a second embodiment. Note that the output processing of this embodiment is the same as the output processing of the aforementioned first embodiment, and thus the description will be made below only to the control unit 8 operating to execute the input processing.

Figure 8:
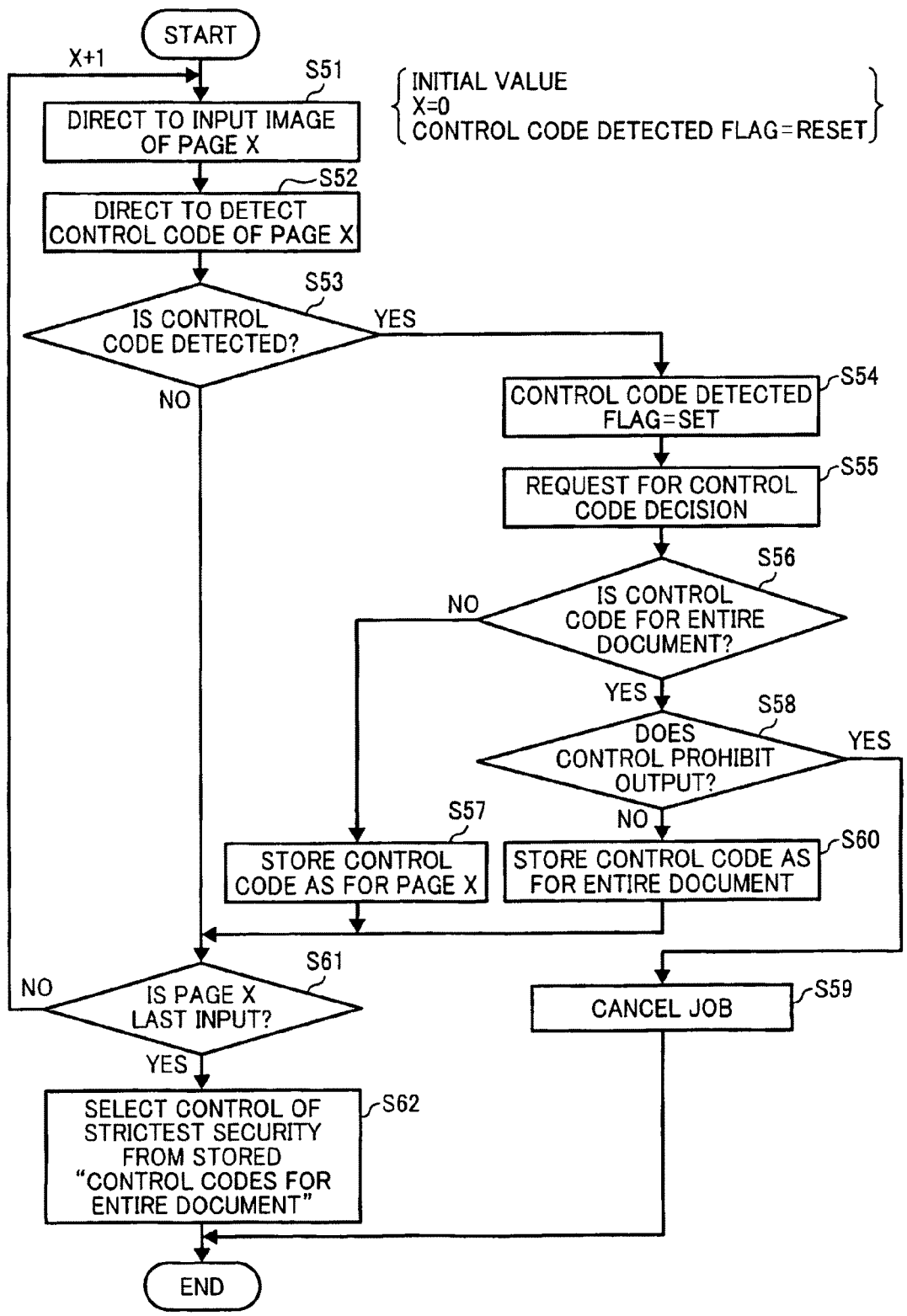
FIG. 8 is a flowchart illustrating the operation flow for a control unit to execute the input processing according to a second embodiment of the present invention.

The flowchart illustrated in FIG. 8 is initiated at the timing at which the user operates the operating unit 2 to thereby read the image data of a document and then commands the execution of an output job. The input processing proceeds to the processing of step S51. Note that the processing of steps S51 to S61 is the same as the processing of the aforementioned steps S21 to S31, and is thus not explained again. Only the processing of step S62 will be described. The processing of step S62 is initiated at the timing at which the Xth page is determined to be the final page in the processing of step S61.

In the processing of step S62, referring to the table illustrated in FIG. 2, the control unit 8 extracts the control code of the highest security level value among those stored as associated with the entire document and then notifies the image output unit 4 of the control code extracted. The image output unit 4 executes the output processing in accordance with the control code of the highest security level value. By doing so, the processing of step S62 is completed and then the sequence of the input processing is completed.

As may be obvious from the above discussions, the input processing of the second embodiment of the present invention makes it possible to provide security to the document in the output processing even when a plurality of control codes are detected. This is because when the control code detection unit 5 has detected a plurality of control codes, the control code decision unit 7 decides to employ, as the content of control for the output processing of image data, the control content that the control code of the highest security level value indicates.

Figure 9A:
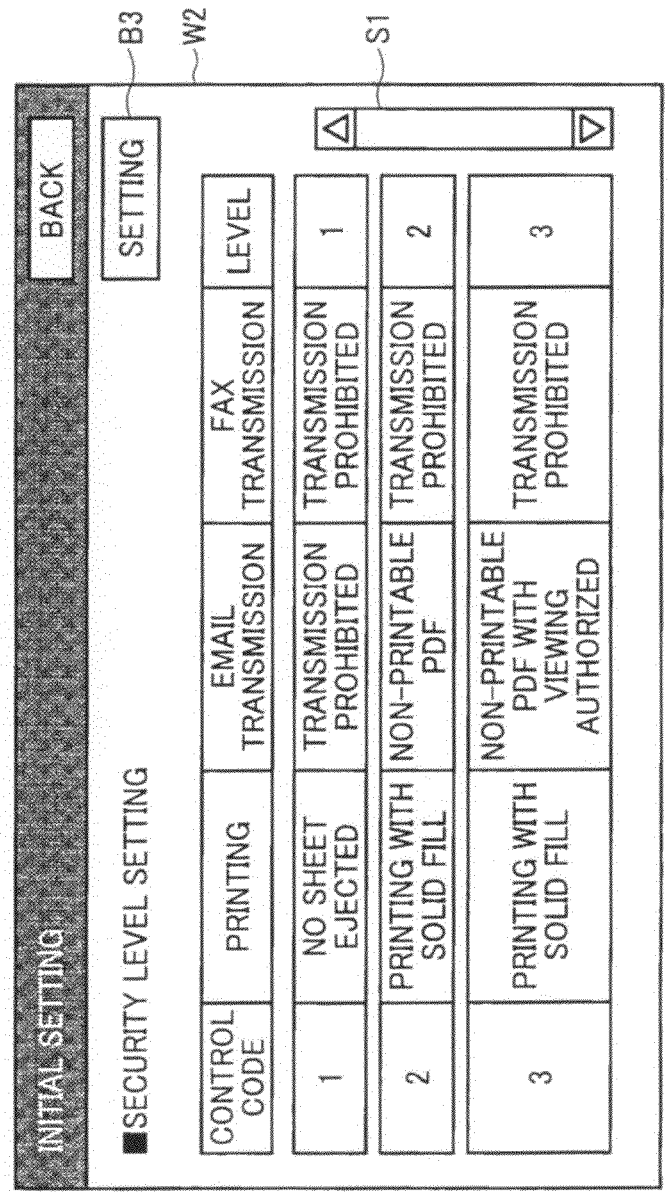
FIGS. 9A and 9B are views illustrating an example of an initial setting window for setting the security level of control information.
Figure 9B:
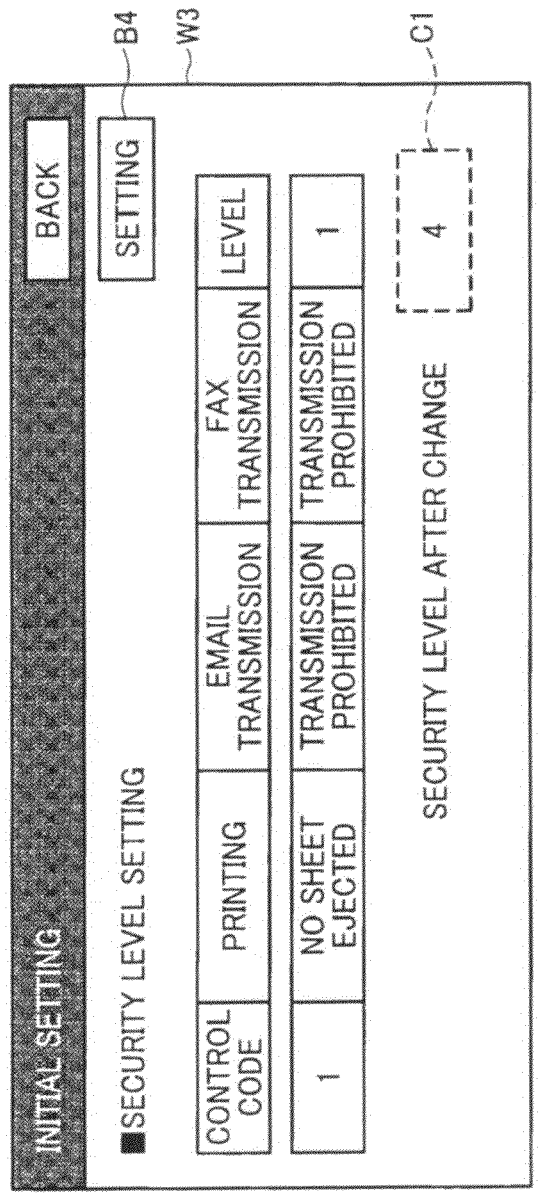

Note that it is also acceptable that the user is allowed to change the security level assigned to each control code by operating the security level setting windows W2 and W3 which are displayed on the touch panel screen of the operating unit 2 as illustrated in FIGS. 9A and 9B, respectively. More specifically, in this case, the user operates the scroll bar S1 on the initial setting window W2 illustrated in FIG. 9A to thereby choose the control code whose security level value he/she desires to change, and then depresses the change button B3. Depressing the change button B3 causes the initial setting window W3 to be displayed as illustrated in FIG. 9B. Referring to the security level value display unit C1 after the change, the user changes the security level value to the value he/she desires and then depresses the set button B4, thereby confirming the change.

Third Embodiment

Now, referring to the flowchart illustrated in FIG. 10, a description will be made to the control unit 8 operating to execute the input processing and the output processing according to a third embodiment. Note that the output processing of the present embodiment is the same as the output processing of the aforementioned first embodiment, and thus the description will be made below only to the control unit 8 operating to execute the input processing.

Figure 10A:
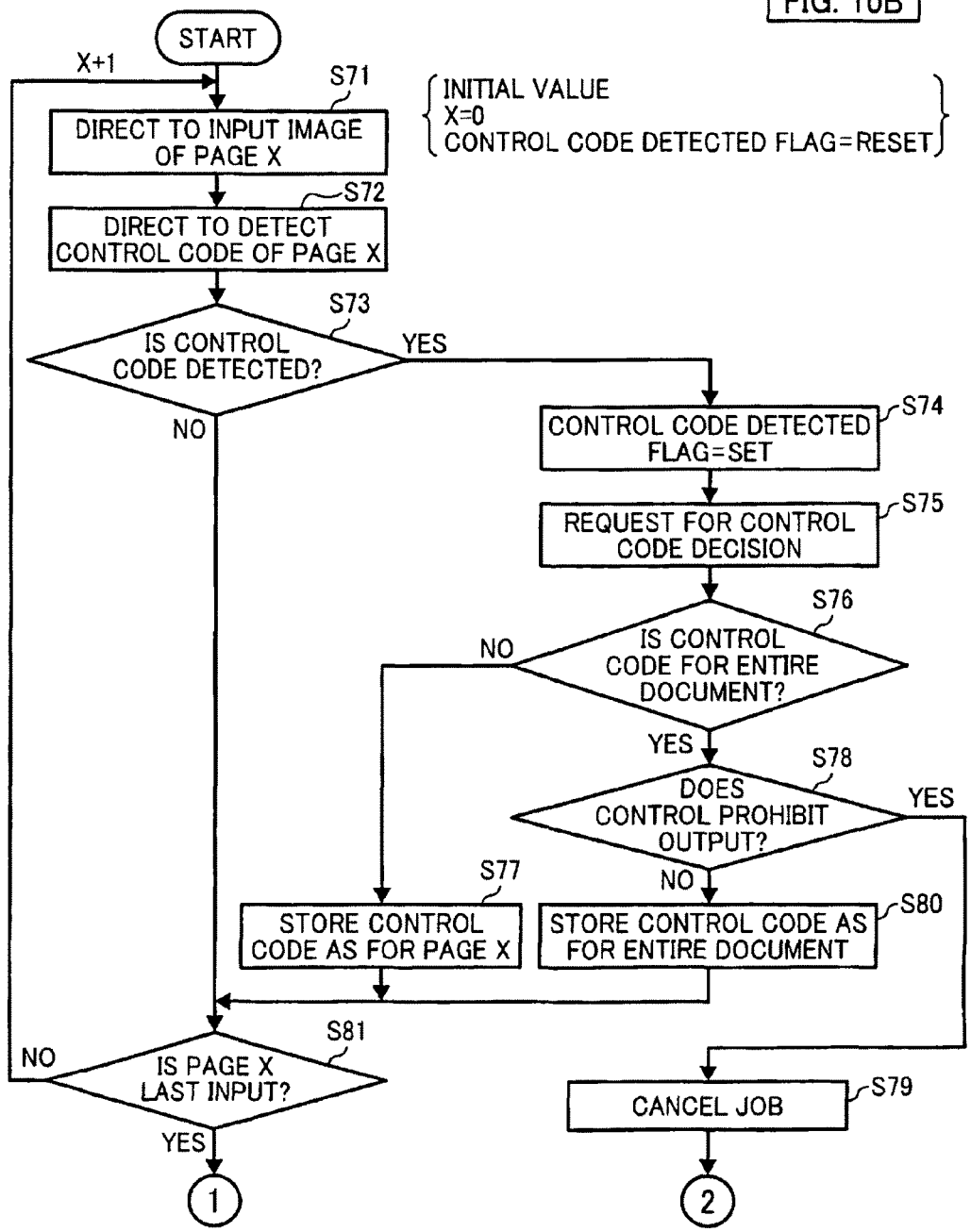
FIG. 10 is a flowchart illustrating the operation flow for a control unit to execute the input processing according to a third embodiment of the present invention.
Figure 10B:
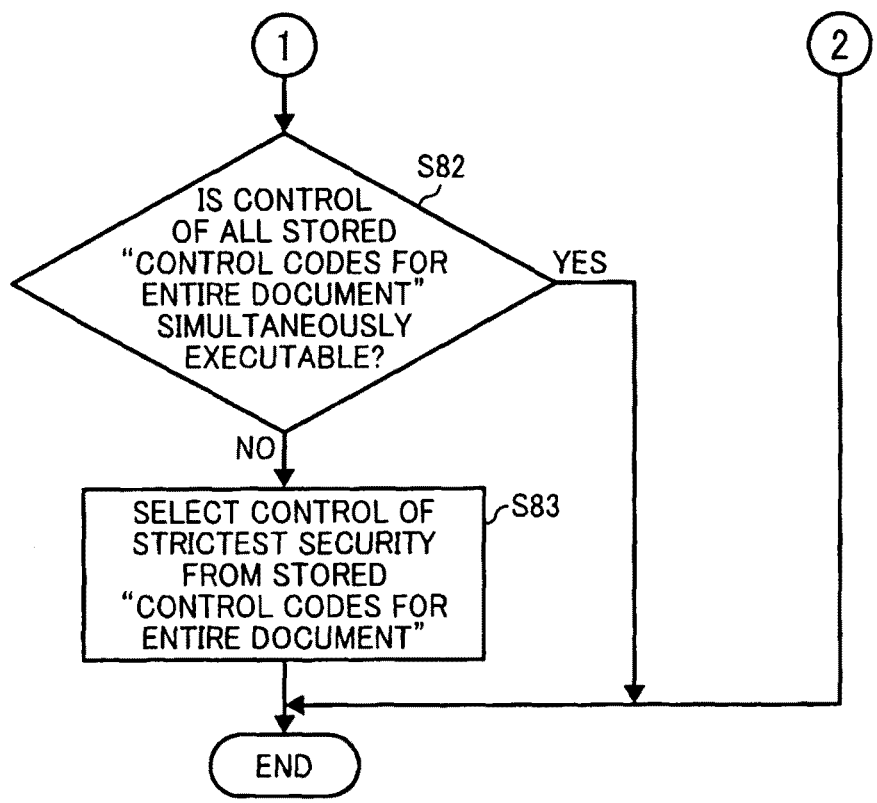

The flowchart illustrated in FIG. 10 is initiated at the timing at which the user operates the operating unit 2 to thereby read the image data of a document and then commands the execution of an output job. The input processing proceeds to the processing of step S71. Note that the processing of steps S71 to S81 is the same as the processing of the aforementioned steps S21 to S31, and is thus not explained again. Only the processing of steps S82 and S83 will be described. The processing of step S82 is initiated at the timing at which the Xth page is determined to be the final page in the processing of step S81.

In the processing of step S82, the control unit 8 determines whether the control contents of all the control codes stored as associated with the entire document are simultaneously executable. When it is found as a result of the determination that the control contents of all the control codes are simultaneously executable, the control unit 8 notifies the image output unit 4 of all the control codes and then terminates the sequence of the input processing. The image output unit 4 executes the output processing based on all the control codes. On the other hand, when it is found that the control contents of all the control codes are not simultaneously executable, the control unit 8 allows the input processing to proceed to the processing of step S83.

In the processing of step S83, referring to the table illustrated in FIG. 2, the control unit 8 extracts the control code of the highest security level value among those stored as associated with the entire document, and then notifies the image output unit 4 of the control code extracted. The image output unit 4 executes the output processing in accordance with the control code of the highest security level value. By doing so, the processing of step S83 is completed and then the sequence of the input processing is completed.

According to the output processing of the aforementioned second embodiment, for example, those control codes such as "Authorized file creation" and "Destination restriction" may be detected. In this case, if the security level value of the "Authorized file creation" code is greater than the security level value of the "Destination restriction" code, then a document with "Authorized file creation" may possibly be transmitted to a destination to which the document should not be transmitted due to "Destination restriction." Thus, some control codes may lead to loose document security in the output processing.

In contrast to this, according to the input processing of the third embodiment of the present invention, the control code decision unit 7 determines whether document security can be ensured in the output processing with the contents of control indicated by the control code of the highest security level value. When document security is determined not to be ensured in the output processing, the control contents indicated by another control code detected by the control code detection unit 5 may be allowed to be contained in the control contents for the output processing of image data. It is thus possible to prevent document security in the output-processing from becoming lower.

Fourth Embodiment

Now, referring to the flowchart illustrated in FIG. 11, a description will be made to the control unit 8 operating to execute the input processing and the output processing according to a fourth embodiment. Note that the output processing of this embodiment is the same as the output processing of the aforementioned first embodiment, and thus the description will be made below only to the control unit 8 operating to execute the input processing.

Figure 11:
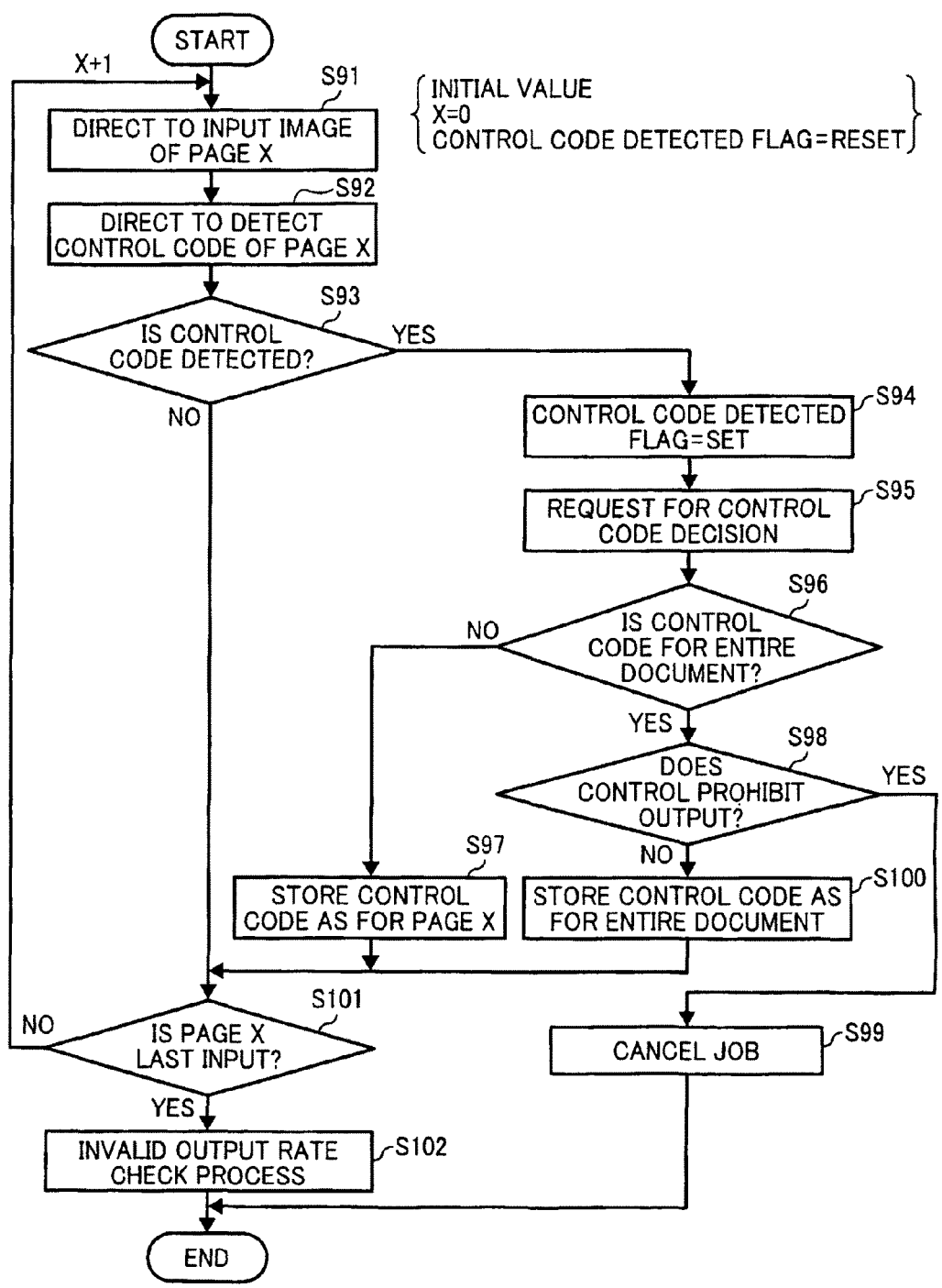
FIG. 11 is a flowchart illustrating the operation flow for a control unit to execute the input processing according to a fourth embodiment of the present invention.

The flowchart illustrated in FIG. 11 is initiated at the timing at which the user operates the operating unit 2 to thereby read the image data of a document and then commands the execution of an output job. The input processing proceeds to the processing of step S91. Note that the processing of steps S91 to S101 is the same as the processing of the aforementioned steps S21 to S31, and is thus not explained again. Only the processing of step S102 will be described. The processing of step S102 is initiated at the timing at which the Xth page is determined to be the final page in the processing of step S101.

In the processing of step S102, the control unit 8 calculates the rate (or the invalid output rate) of the number of pages for invalid output (for example, printed with solid fill or ejected left blank) to the total number of pages, and then controls the subsequent output processing depending on the calculated value of the invalid output rate (the invalid output rate check process). The invalid output rate check process will be detailed later with reference to the flowchart illustrated in FIG. 12. By doing so, the processing of step S102 is completed and then the sequence of the input processing is completed.

[Invalid Output Rate Check Process]

Now, referring to the flowchart illustrated in FIG. 12, a description will be made to the control unit 8 operating to execute the invalid output rate check process.

Figure 12:
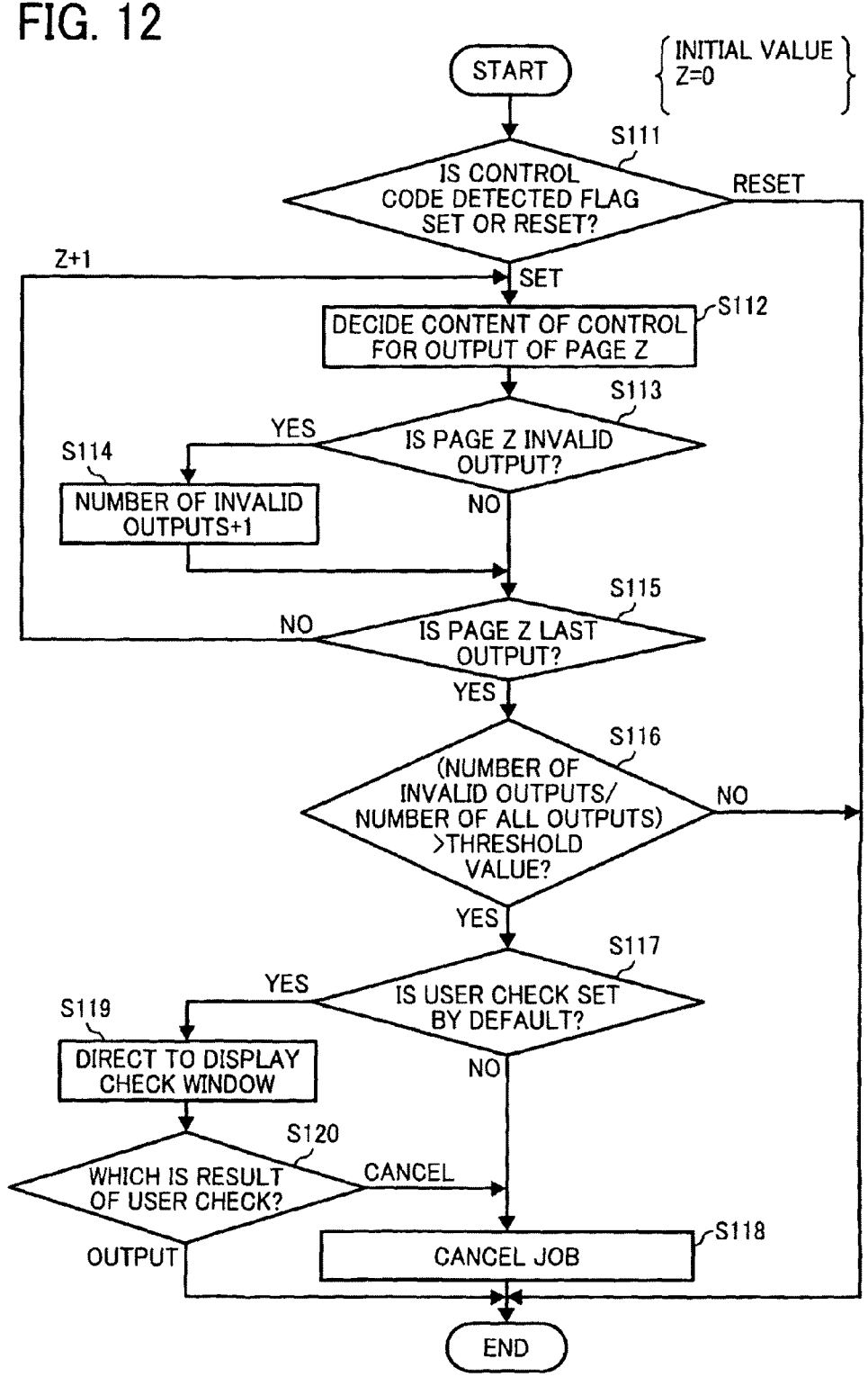
FIG. 12 is a flowchart illustrating a subroutine of the processing in step S102 illustrated in FIG. 11.

The flowchart illustrated in FIG. 12 is initiated at the timing at which the Xth page is determined to be the final page in the processing of step S101. The invalid output rate check process proceeds to the processing of step S111.

In the processing of step S111, the control unit 8 determines whether the control code detected flag is at a SET status or a RESET status. When it is found as a result of the determination that the control code detected flag is at a RESET status, the control unit 8 terminates the invalid output rate check process. On the other hand, when it is found as a result of the determination that the control code detected flag is at a SET status, the control unit 8 allows the invalid output rate check process to proceed to the processing of step S112.

In the processing of step S112, the control unit 8 decides the content of control that is to be provided when the image data of the Zth (initial value 0) page that constitutes a document is output. More specifically, the control unit 8 decides the content of control based on the control code for the Zth page. By doing so, the processing of step S112 is completed, and the invalid output rate check process proceeds to the processing of step S113.

In the processing of step S113, the control unit 8 determines based on the result of the processing of step S112 whether the output of the image data of the Zth page has been set to be invalid (for example, to be printed with solid fill or ejected left blank). When it is found as a result of the determination that the output is set to be invalid, the control unit 8 increments the value of a counter by one as the processing of step S114, the counter being configured to count the number of pages that are set to be invalid. Then, the control unit 8 allows the invalid output rate check process to proceed to the processing of step S115. On the other hand, when it is found that the output is not set to be invalid, the control unit 8 allows the invalid output rate check process to proceed to the processing of step S115.

In the processing of step S115, the control unit 8 determines whether the Zth page is the final page. When it is found as a result of the determination that the Zth page is the final page of the document, the control unit 8 allows the invalid output rate check process to proceed to the processing of step S116. On the other hand, when it is found that the Zth page is not the final page of the document, the control unit 8 increments the value of Z by one and then allows the invalid output rate check process to return to the processing of step S112.

In the processing of step S116, based on the value of the counter for counting the number of pages whose output is set to be invalid, the control unit 8 calculates the rate of the number of invalid output pages to the total number of pages, and then determines whether the calculated rate is equal to or greater than a predetermined threshold. When it is found as a result of the determination that the calculated rate is less than the predetermined threshold, the control unit 8 terminates the invalid output rate check process. On the other hand, when it is found that the calculated rate is equal to or greater than the predetermined threshold, the control unit 8 allows the invalid output rate check process to proceed to the processing of step S117.

Figure 13:
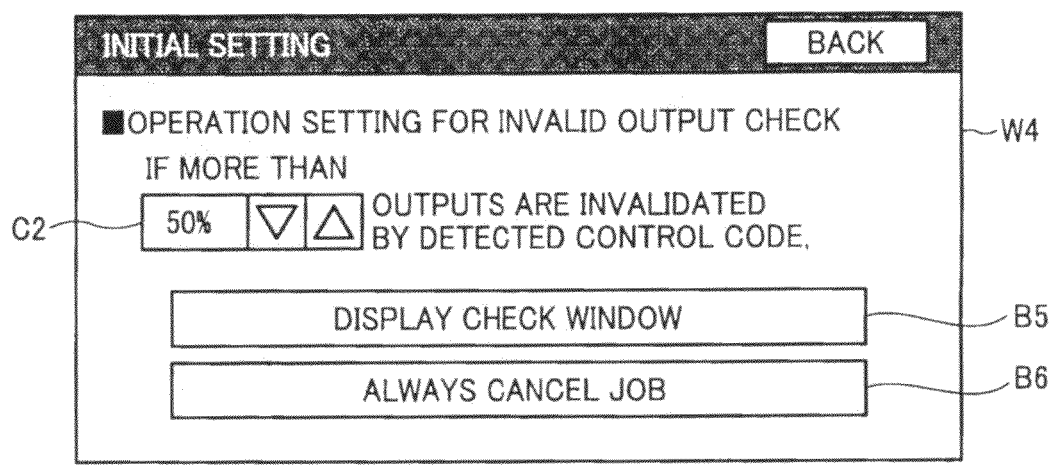
FIG. 13 is a view illustrating an example of an initial setting window for setting the operation to be executed when an invalid output rate is equal to or greater than the setting value.

In the processing of step S117, the control unit 8 determines whether there has been provided in advance a setting for the user to check to see if the output processing is to be executed. The present embodiment has prepared an initial setting window W4 for setting whether to display a check window on which the user can check to see if the output processing as illustrated in FIG. 13 is to be executed, and for setting the threshold in the processing of step S116. The user operates the buttons B5 and B6 to thereby set whether to display the check window, and operates a threshold setting column C2 to thereby set the threshold. Based on the conditions set on this initial setting window W4, the control unit 8 determines whether there is a setting provided for checking to see if the output processing is to be executed. When it is found as a result of the determination that there is no setting provided for checking to see if the output processing is to be executed, the control unit 8 allows the invalid output rate check process to proceed to the processing of step S118. On the other hand, when it is found as a result of the determination that there is a setting provided for checking to see if the output processing is to be executed, the control unit 8 allows the invalid output rate check process to proceed to the processing of step S119.

In the processing of step S118, the control unit 8 prohibits the execution of the output processing directed by the user (cancels the job), and controls the operating unit 2 to thereby notify the user that the execution of the output processing was prohibited. By doing so, the processing of step S118 is completed and then the sequence of the invalid output rate check process is terminated.

In the processing of step S119, the control unit 8 displays the check window for checking to see whether the operating unit 2 is to be operated to thereby execute the output processing. By doing so, the processing of step S119 is completed, and then the invalid output rate check process proceeds to the processing of step S120.

In the processing of step S120, the control unit 8 determines whether the user operated the operating unit 2 to thereby direct to cancel the execution of the output processing. When it is found as a result of the determination that the user canceled the execution of the output processing, the control unit 8 returns the invalid output rate check process to the processing of step S118. On the other hand, when it is found that the user did not cancel the execution of the output processing, the control unit 8 terminates the sequence of the input processing.

As may be obvious from the above discussions, according to the input processing of the fourth embodiment of the present invention, the control unit 8 calculates the rate of the number of invalid output pages to the total number of pages as the invalid output rate. When the calculated invalid output rate is equal to or greater than the predetermined threshold, the output of the entire document is prohibited. It is thus possible to prevent meaningless steps of the output processing from being executed, thus providing improved convenience for the user.

Furthermore, according to the input processing of the fourth embodiment of the present invention, if the invalid output rate is equal to or greater than the predetermined threshold, the control unit 8 displays the check window for checking to see if the output processing is to be continued. Then, depending on the direction by the user, the control unit 8 determines whether to continue the output processing, thereby providing further improved convenience for the user.

While the embodiments of the invention developed by the inventor have been described above, it is to be understood that the descriptions and drawings, which form part of the disclosure of the present invention according to the embodiments, will not limit the present invention. That is, other embodiments, examples, and implemented techniques that are developed by those skilled in the art based on the aforementioned embodiments are all to be within the scope and spirit of the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming device comprising:
an image input unit configured to input image data of a document having a plurality of pages on a page-by-page basis;
a control code detection unit configured to detect a control code for output processing of the image data on a page-by-page basis, the control code being added to the image data inputted by the image input unit;
an image data storage unit configured to store, in a memory unit, image data of a page entered after the page with a first control code added thereto, when the control code detection unit detects the first control code;
a control code decision unit configured to decide a content of control for an entirety of the output processing of the image data in accordance with the first control code and a second control code added to image data of the page entered after the page with the first control code, when the control code detection unit detects the second control code; and
a control unit configured to,
delay the output processing of the image data stored in the memory unit until the control code detection unit completes the detection on all of the plurality of pages of the document, and
control the entirety of the output processing of the image data stored in the memory unit in accordance with the control decided by the control code decision unit for the entirety of the output processing.

2. The image forming device according to claim 1, comprising a switch unit configured to switch a mode of operation of the image data storage unit between a first mode of operation and a second mode of operation,
wherein when the control code detected by the control code detection unit is a control code for the entire document, during the first mode of operation, the image data storage unit stores, in the memory unit, the image data of a page entered after the page with the control code attached thereto, and
wherein during the second mode of operation, the image data storage unit stores, in the memory unit, the image data of all pages regardless whether the control code detected by the control code detection unit is a control code for the entire document.

3. The image forming device according to claim 1, wherein, when a control code capable of deciding a content of control for image data output processing is detected before image data of all pages is completely input, the control code decision unit directs the control unit to start the output processing of the image data in accordance with the content of control.

4. The image forming device according to claim 1, wherein, when a plurality of control codes are detected by the control code detection unit, the control code decision unit decides to employ a content of control indicated by a control code of the highest security level value as a content of control for image data output processing.

5. The image forming device according to claim 4, further comprising setting unit for receiving an operation to set the security level value of the control code.

6. The image forming device according to claim 4, wherein: the control code decision unit determines whether document security can be ensured for output processing with the content of control indicated by the control code of the highest security level value; and when it is determined that document security for output processing cannot be ensured, a content of control indicated by another control code detected by the control code detection unit is included in a content of control for output processing of image data.

7. The image forming device according to claim 1, wherein the control unit calculates a rate of a number of invalid output pages to a total number of pages as an invalid output rate, and prohibits the output processing of the entire document when the calculated invalid output rate is equal to or greater than a predetermined threshold.

8. The image forming device according to claim 7, further comprising:
a display unit configured to display a check window to see whether the output processing is to be continued when the invalid output rate is equal to or greater than the predetermined threshold; and
an operation unit configured to input an operation input signal indicative of whether the output processing is to be continued, and
wherein the control unit decides whether to continue the output processing in accordance with the operation input signal entered at the operation unit.

9. A method for controlling an image forming device, comprising:
an image input step of inputting, on a page-by-page basis, image data of a document having a plurality of pages;
a control code detection step of detecting, on a page-by-page basis, a control code for output processing of the image data, the control code being attached to the image data input in the image input step;
an image data storing step of storing, in memory unit, image data of a page entered after the page with a first control code attached thereto, when the first control code is detected in the control code detection step;
a control code decision step of deciding a content of control for an entirety of the output processing of the image data in accordance with the first control code and a second control code added to image data of a page entered after the page with the first control code, when the control code detection unit detects the second control code; and
a control step of,
delaying the output processing of the image data stored in the memory unit until the control code detection step completes the detection on all of the plurality of pages of the document, and
controlling the entirety of the output processing of the image data stored in the memory unit during the image data storing step in accordance with the control decided in the control code decision step for the entirety of the output processing.

10. A non-transitory computer program product comprising a computer usable medium having computer readable program codes embodied in the medium that when executed causes a non-transitory computer to execute:
an image input step of inputting, on a page-by-page basis, image data of a document having a plurality of pages;
a control code detection step of detecting, on a page-by-page basis, a control code for output processing of the image data, the control code being added to the image data inputted in the image input step;
an image data storing step of storing, in memory unit, image data of a page entered after the page with a first control code added thereto, when the control code is detected in the control code detection step;
a control code decision step of deciding a content of control for an entirety of the output processing of the image data in accordance with the first control code and a second control code added to image data of a page entered after the page with the first control code, when the control code detection unit detects the second control code; and
a control step of,
delaying the output processing of the image data stored in the memory unit until the control code detection step completes the detection on all of the plurality of pages of the document, and
controlling the entirety of the output processing of the image data stored in the memory unit during the image data storing step in accordance with the control decided in the control code decision step for the entirety of the output processing.

11. An image forming device comprising:
an image input unit configured to input image data of a document having a plurality of pages on a page-by-page basis;
a control code detection unit configured to detect control codes on the plurality of pages and associate the detected control codes with the image data;
an image data storage unit configured to store, in a memory unit, the detected control codes;
a control code decision unit configured to determine whether output processing of the document as a whole is allowable based on a plurality of the detected control codes, if the control code detection unit detects more than one of the control codes within the plurality of pages; and
a control unit configured to,
delay the output processing of the image data stored in the memory unit until the control code detection unit completes the detection on all of the plurality of pages, and
control the output processing of the image data stored in the memory unit in accordance with a result of the determination of whether output processing of the document as a whole is allowable.

* * * * *